(12) United States Patent  
Wada et al.

(10) Patent No.: US 8,992,103 B2  
(45) Date of Patent: *Mar. 31, 2015

(54) DOME CAMERA

(71) Applicant: Panasonic Corporation, Osaka (JP)

(72) Inventors: Jyouji Wada, Kanagawa (JP); Tamotsu Uchida, Fukuoka (JP); Tetsuro Kajino, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/261,909

(22) Filed: Apr. 25, 2014

(65) Prior Publication Data

US 2014/0233935 A1 Aug. 21, 2014

Related U.S. Application Data

(63) Continuation of application No. 13/704,758, filed as application No. PCT/JP2011/003171 on Jun. 6, 2011.

(30) Foreign Application Priority Data

Jun. 23, 2010 (JP) .................................. 2010-143105

(51) Int. Cl.
*G03B 17/00* (2006.01)
*H04N 7/18* (2006.01)
(Continued)

(52) U.S. Cl.
CPC ............ *G03B 17/561* (2013.01); *H04N 5/2252* (2013.01); *H04N 5/23238* (2013.01); *G03B 17/56* (2013.01); *G03B 37/02* (2013.01)
USPC .............................. 396/427; 348/143; 348/151

(58) Field of Classification Search
USPC .................. 396/427, 428, 535; 348/143, 151, 348/373–376
See application file for complete search history.

(56) References Cited

U.S. PATENT DOCUMENTS 8,405,766 B2\* 3/2013 Tatewaki ........................ 348/373
8,764,318 B2\* 7/2014 Wada et al. .................... 396/427
(Continued)

FOREIGN PATENT DOCUMENTS

CN 101258739 9/2008
CN 101455073 6/2009
(Continued)

OTHER PUBLICATIONS

Search report from E.P.O., mail date is Mar. 18, 2013.
(Continued)

*Primary Examiner* — Clayton E Laballe
*Assistant Examiner* — Minh Phan
(74) *Attorney, Agent, or Firm* — Greenblum & Bernstein P.L.C.

(57) ABSTRACT

A dome camera includes an inner cover covering a camera lens and a semi-spherical outer cover covering the inner cover, the camera lens being rotatable in a tilt direction and in a pan direction. The inner cover includes a partially spherical portion having an inclined support plane on which the outer cover is supported such that a radial line perpendicular to the inclined support plane is inclined at a predetermined inclination angle with respect to a line passing through a center of the partially spherical portion and extends perpendicular to the installation face. A semi-spherical portion has a window, the semi-spherical portion is covered by the outer cover supported on the inclined support plane, and the outer cover rotatable in the pan direction, so as to orient the window in accordance with the orientation of the camera lens.

19 Claims, 11 Drawing Sheets

(51) Int. Cl.
*G03B 17/56* (2006.01)
*H04N 5/225* (2006.01)
*H04N 5/232* (2006.01)
*G03B 37/02* (2006.01)

(56) References Cited

U.S. PATENT DOCUMENTS

| | | | |
|---|---|---|---|
| 2003/0103160 A1 | 6/2003 | Tatewaki et al. | |
| 2004/0032492 A1 | 2/2004 | Wada et al. | |
| 2006/0017842 A1* | 1/2006 | Jun | 348/373 |
| 2006/0050150 A1* | 3/2006 | Yamane | 348/151 |
| 2007/0292121 A1 | 12/2007 | Sato | |
| 2008/0002026 A1 | 1/2008 | Okamura et al. | |
| 2008/0231699 A1 | 9/2008 | Konishi et al. | |
| 2009/0162048 A1 | 6/2009 | Tatewaki | |
| 2009/0251538 A1* | 10/2009 | Wada et al. | 348/143 |
| 2011/0115973 A1 | 5/2011 | Tatewaki | |

FOREIGN PATENT DOCUMENTS

| | | |
|---|---|---|
| EP | 1608152 | 12/2005 |
| EP | 2026564 | 2/2009 |
| GB | 2442682 | 4/2008 |
| JP | 2000-244781 | 9/2000 |
| JP | 2003-302695 | 10/2003 |
| JP | 2004-48107 | 2/2004 |
| JP | 2004-356669 | 12/2004 |
| JP | 2005-221637 | 8/2005 |
| JP | 2006-33704 | 2/2006 |
| JP | 2007-334116 | 12/2007 |
| JP | 2008-10942 | 1/2008 |
| JP | 2008-35504 | 2/2008 |
| WO | 2010/010658 | 1/2010 |
| WO | WO 2010010658 A1 * | 1/2010 ............. G03B 17/02 |

OTHER PUBLICATIONS

International Search report from, mail date is Mar. 15, 2011.
International Search Report issued Oct. 25, 2011 with English language translation.
International Preliminary Report on Patentability, English language translation, issued Jan. 17, 2013.
China Office action, dated Nov. 2, 2014 along with an English translation thereof.

* cited by examiner (a)

(b)

(c)

DOME CAMERA

CROSS-REFERENCE TO RELATED APPLICATIONS

This is a continuation of pending U.S. patent application Ser. No. 13/704,758, filed on Dec. 17, 2012, which is a National Stage of International Patent Application No. PCT/JP2011/003171, filed Jun. 6, 2011, which claims priority to Japanese Application No. 2010-143105, filed on Jun. 23, 2010, the disclosures of which are expressly incorporated by reference herein in their entireties.

TECHNICAL FIELD

The present invention relates to a dome camera having a dome cover covering a camera lens, and particularly to a fixed-type dome camera having a camera lens whose direction is manually set.

BACKGROUND ART

Dome cameras are generally categorized into two types: fixed-type dome cameras and movable-type dome cameras. The fixed-type dome camera has a fixed direction of a camera lens in a certain direction once the direction of the camera lens is manually set in this direction at the time of the installation, and the camera picks up a camera image in this set (fixed) direction. Specifically, in the fixed-type dome camera, the direction of the camera lens is adjustable in a certain angular range, so that the camera lens can be directed toward a target direction when the camera is installed. This angular range is an angular range where the direction of the camera lens can be adjustable during installing the camera, and may also be referred to as an "acceptable setting range". Once the direction of the camera lens is set in a certain direction, the camera lens is fixed to be directed in this direction (set direction). Such a fixed-type dome camera may be used in surveillance in a predetermined area using a single camera.

In the movable-type dome camera, a camera lens is electrically adjustable (using a pan motor or a tilt motor, etc.) even after the camera is installed. Hence, the movable-type dome camera does not employ a manual setting of the direction of the camera lens, as the fixed-type dome camera does. Specifically, the direction of the camera lens is adjustable within a visible range to be directed in a desired direction after the camera is installed. The "visible range" denotes an angular range where the direction of the camera lens can be changed after the camera is installed, and the visible range of the movable-type dome camera may be set such that: "the pan direction: 360° (0° to 360°), the tilt direction: 75° (0° to 75°)". Meanwhile, in the fixed-type dome camera, the direction of the camera lens is unchangeable after the camera is installed; therefore, the visible range may be set such that: "the pan direction: ±0°, the tilt direction: ±0°". Not to mention that the concept of the "visible range" is quite different from the concept of the aforementioned "acceptable setting range".

The fixed-type dome camera is relatively inexpensive, but there is limitation that a single camera can monitor only one area. To the contrary, the movable-type dome camera is relatively expensive, but multiple areas can be monitored using a single camera. As mentioned above, the dome cameras are categorized into two types: the fixed type and the movable type, and the present invention relates to the fixed-type dome camera having a camera lens whose direction is fixed manually.

Conventional fixed-type dome cameras employ semi-spherical dome covers. Taking the lens effect of a dome cover into account, a camera image in higher quality can be obtained by bringing an optical axis of the camera lens to pass through the spherical center of the dome cover. However, a conventional dome camera causes vignetting if the direction of its camera lens exceeds a certain angle (inclination limit angle) when the camera is set in the horizontal direction (horizontal direction if the summit direction of the dome is directed upward) or in the depression angle direction (more downward direction than the horizontal direction if the summit direction of the dome is directed upward) with its camera lens tilted. For this reason, the acceptable setting range of the conventional fixed-type dome camera is limited within a range of 0° (summit direction of the dome) to 75° (inclination limit angle) in the tilt direction.

There is suggested a conventional fixed-type dome camera that can tilt its camera lens at the depression angle direction (see Patent Literature 1, for example). In this conventional dome camera, the tilt direction of the camera lens in the horizontal direction or in the depression angle direction can be attained by deviating the position of an optical axis of the camera lens from a spherical center of a dome cover, which means that the tilt direction of the camera lens can be defined within a broader angular range.

Unfortunately, in such a conventional dome camera, the position of the optical axis of the camera lens is deviated from the spherical center of the dome cover if the tilt direction of the camera lens is set in the horizontal direction or in the depression angle direction; therefore, quality of a camera image becomes deteriorated due to the lens effect of the dome cover. Consequently, it is extremely difficult to cope with allowing the setting of the tilt direction of the camera lens in a broader angular range (even in the horizontal direction or in the depression angle direction) and realizing a camera image in high quality even if the tilt direction of the camera lens is set in the horizontal direction or in the depression angle direction.

CITATION LIST

Patent Literature

Patent Literature 1: Japanese Patent Laid-Open No. 2005-221637

SUMMARY OF INVENTION

Technical Problem

An object of the present invention, which has been made under the aforementioned background, is to provide a dome camera capable of setting a tilt direction of a camera lens in a broader angular range (even in the horizontal direction or in the depression angle direction), and realizing a camera image in high quality even if the tilt direction of the camera lens is set in the horizontal direction or in the depression angle direction.

Solution to Problem

One aspect of the present invention provides a dome camera having a camera lens, a direction of the camera lens being manually set, and this dome camera includes a base having a parallel support face parallel to an installation face to which the dome camera is installed; the camera lens provided on the base so as to be rotatable in a tilt direction and in a pan direction; an inner cover supported on the parallel support face so as to cover the camera lens; and a semispherical dome cover covering the inner cover, wherein the pan direction of the camera lens has a predefined target direction to be set, the inner cover is rotatable in the pan direction relative to the base, so as to be directed in the target direction, and the inner cover has an inclined support plane on which the dome cover is supported in such a manner that a summit direction of the dome cover is inclined at a predetermined inclination angle from a direction vertical to the installation face, the dome cover has an acceptable tilt setting range from the summit direction of the dome cover to a predetermined inclination limit angle, the tilt direction of the camera lens is set within an angular range from the direction vertical to the installation face to an enlarged inclination limit angle defined by adding the inclination angle to the inclination limit angle of the dome cover, and an optical axis of the camera lens passes through a spherical center of the dome cover.

As explained hereinafter, the present invention also includes another aspect. Therefore, the disclosure of the present invention is intended to provide a part of the aspects, and it is not intended to limit the scope of the present invention set forth and claimed herein.

DESCRIPTION OF EMBODIMENTS

Figure 1:
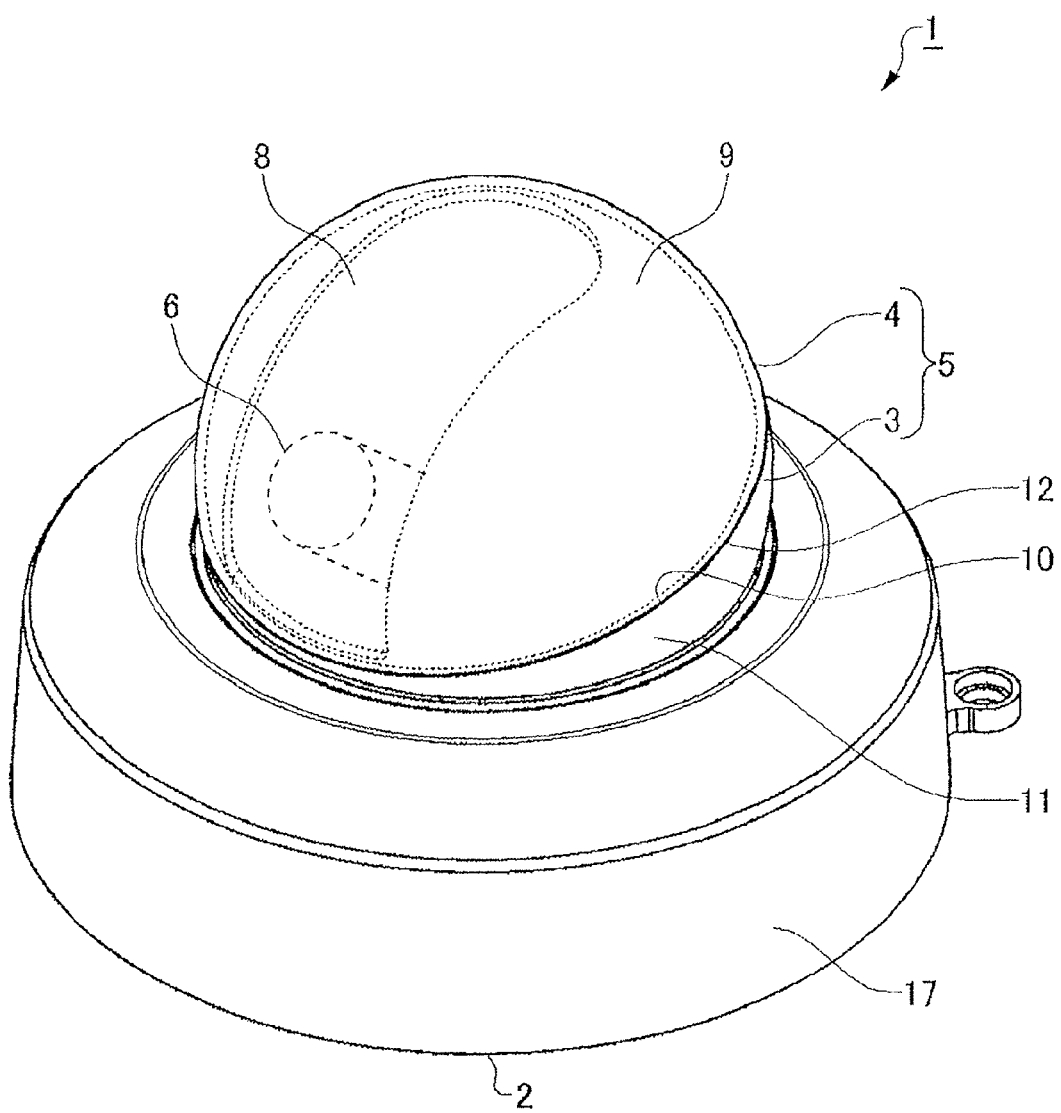
FIG. 1 is a perspective view of a dome camera according to a first embodiment of the present invention.

Detailed description of the present invention will be provided, hereinafter. The present invention is however not limited to the following detailed description and the accompanying drawings.

The dome camera of the present invention is a dome camera having a camera lens whose direction is set manually, and includes: a base having a parallel support face that is horizontal to an installation face to which the dome camera is installed; the camera lens provided on the base, and rotatable in the tilt direction and in the pan direction; an inner cover supported on the parallel support face so as to cover the camera lens; and a semispherical dome cover that covers the inner cover, wherein the pan direction of the camera lens has a predefined target direction to be set, the inner cover is manually rotated relative to the base in the pan direction, so as to be directed in the target direction, and the inner cover has an inclined support plane on which the dome cover is supported in such a state that the summit direction of the dome cover is inclined at a predetermined inclination angle from the vertical direction relative to the installation face for the dome cover, so that the dome cover has an acceptable tilt setting range from the summit direction of the dome cover to a predetermined inclination limit angle, the tilt direction of the camera lens can be set in an angular range from an angle corresponding to the vertical direction relative to the installation face to an enlarged inclination limit angle defined by adding the inclination angle to the inclination limit angle of the dome cover, and the optical axis of the camera lens passes through the spherical center of the dome cover.

In this configuration, the tilt direction of the camera lens can be set in a broader angular range from the vertical direction relative to the installation face to the enlarged inclination limit angle (angle defined by adding the inclination angle to the inclination limit angle of the dome cover). For example, in a common dome camera, if the inclination limit angle of the dome cover is 75° (assuming that the summit direction is 0°), the tilt direction of its camera lens can be set only within the angular range from the summit direction)(0° to the inclination limit angle (75°, for example) of the dome cover. In the conventional dome camera (the dome camera of Patent Literature 1), the tilt angle of the camera lens can be set in a broader angular range (range from 0° to 90°, for example), but the position of the optical axis of the camera lens is deviated from the spherical center of the dome cover, resulting in deterioration of quality of a camera image due to the lens effect of the dome cover. To the contrary, the present invention predefines the target direction (direction to be set) of the pan direction of the camera lens, so that the inclination limit angle is enlarged by inclining the dome cover in the target direction. For example, if the inclination angle (inclination angle of the inclination support plane) of the dome cover is 15°, the tilt direction of the camera lens can be set in a broader range from the vertical direction relative to the installation face (0°) to the enlarged inclination limit angle (90°=75°+15°). Addition to this, the present invention can realize a camera image in high quality because the optical axis of the camera lens passes through the spherical center of the dome cover.

In the dome camera of the present invention, the inner cover and the dome cover may be combined integrally and continuously on the inclination support plane, so as to have a substantially spherical appearance.

In this configuration, the inner cover and the dome cover generally has a spherical appearance in combination of the inner cover and the dome cover on the inclination support plane, which prevents inference of the camera direction through the appearance of the dome camera.

In the dome camera of the present invention, the inner cover may include a semi-spherical portion having a window to be directed toward the target direction, and a partially spherical portion having an inclined step portion for supporting an end of the dome cover, and the spherical centers of the semi-spherical portion and the partially spherical portion may be concentric with the spherical center of the dome cover.

This configuration enables the inner cover to have a function for securing a visual field of the camera lens (function as the window), and a function for supporting the dome cover (function as the inclined step portion). In this case, one component (inner cover) has the both functions, which reduces the number of components of the dome camera.

In the dome camera of the present invention, the dome cover may have plural locking portions, and the inner cover may have plural locked portions to be engaged with the plural locking portion, and the locking portions are engaged with the locked portions so as to fix the dome cover to the inner cover.

In this configuration, the dome cover can readily be fixed to the inner cover by engaging the locking portions of the dome cover with the locked portions of the inner cover.

In the dome camera of the present invention, each locking portion may include a locking projection in an L shape extending from the end of the dome cover, each locked portion may include a locked recess provided on an inner face of the inner cover, and insertion holes may be formed in the inclined step portion of the inner cover, so that each locking projections is inserted through each insertion hole, and is engaged with each locked recesses.

In this configuration, the dome cover can readily be fixed to the inner cover by inserting the locking projections at the end of the dome cover through the insertion holes in the inclined step portion of the inner cover, so as to be engaged with the locked recesses of the inner cover.

In the dome camera of the present invention, each locking portion includes a locking hole formed in each locking projection, each locked portion includes a locked protrusion provided on each locked recess, and the locked protrusion includes an inclined face and a lock wall, and in an engagement of each locking projection with each locked recess, a periphery of the locking hole moves beyond the inclined face, and the locking hole comes into engagement with the locked protrusion, so that against an attempt of unlock the engagement between each locking projection and each locked recess, the periphery of each locking hole is locked by each lock wall, so as to prevent unlocking of the engagement between each locking hole and each locked protrusion.

In the installation of the dome cover to the inner cover, the engagement of each locking projection with each locked recess is attained such that the periphery of each locking hole moves beyond the inclined face, and each locking hole is then engaged with each locked protrusion. The dome cover is thus readily fixed to the inner cover. On the other hand, if an attempt to unlock the engagement between each locking projection and each locked recess is made so as to uninstall the dome cover from the inner cover, the periphery of the locking hole of each locking projection is locked by each lock wall, thereby preventing the unlocking of the engagement between each locking portion and each locked portion. This configuration prevents the dome cover from being readily uninstalled from the inner cover.

The dome camera of the present invention may employ the following configuration that each locking portion includes a locking hole disposed in each locking projection, and each locked portion includes a locked protrusion provided on each locked recess, and each locked protrusion includes a first inclined face and a second inclined face; in the engagement of each locking projection with each locked recess, a periphery of each locking hole may move beyond the first inclined face, and each projecting hole may come into engagement with each locked protrusion; and in the unlocking of the engagement between each locking projection and each locked recess, the periphery of each locking hole may move beyond the second inclined face, so as to unlock the engagement between each locking hole and each locked protrusion.

In the installation of the dome cover to the inner cover, the engagement of each locking projection with each locked recess is attained such that the periphery of the locking hole of each locking projection may move beyond the first inclined face, and each projecting hole comes into engagement with each locked protrusion. The dome cover is thus readily fixed to the inner cover. In the uninstallation of the dome cover from the inner cover, the unlocking of the engagement between each locking projection and each locked recess is attained such that the periphery of the locking hole of each locking projection moves beyond the second inclined face, thereby unlocking the engagement between each locking portion and each locked portion. The dome cover is thus readily uninstalled from the inner cover. In this manner, the dome cover can be detachably installed to the inner cover.

In the dome camera of the present invention, each locking projection may have a smaller thickness than that of the dome cover.

Each locking projection at the end of the dome cover has a smaller (thinner) thickness than that of the dome cover, so that each locking portion can have an appropriate flexibility. (The periphery of the locking hole of) each locking projection with an appropriate flexibility can easily moves beyond the inclined face of each locked protrusion when the dome cover is installed to the inner cover; thus, the dome cover can readily be fixed to the inner cover.

In the dome camera of the present invention, in the engagement state between each locking portion and each locked portion, the inner faces of the dome cover and the inner cover may be aligned in height.

The alignment in height of the inner faces of the dome cover and the inner cover can prevent the camera lens or the like from being caught by the inner face of the cover (the inner cover and the dome cover) even if the inner cover is rotated with the dome cover installed to the inner cover.

In the dome camera of the present invention, the end of the dome cover may have the same color as that of the inclined step portion of the inner cover.

When the dome cover and the inner cover are combined to each other, the combined portions (of the end of the dome cover and the inclined step portion of the inner cover) have the same color tone, which prevents the difference in color tone at the combined portions. The dome camera thus has a substantially spherical appearance, which prevents inference of the direction of the camera lens through the appearance of the dome camera.

In the dome camera of the present invention, the end of the dome cover may have a dark color.

When the inner cover and the dome cover are combined to each other, the end of the dome cover having a dark color (black or gray, for example) prevents the difference in color tone at the combined portions (end of the dome cover). The dome camera thus has a substantially spherical appearance, which prevents inference of the direction of the camera lens through the appearance of the dome camera.

In the dome camera of the present invention, a smoke treatment may be applied to the dome cover.

When the inner cover and the dome cover are combined to each other, the dome cover to which the smoke treatment is applied prevents the internal structure from being visible through the dome cover, which hinders inference of the direction of the camera lens through the appearance of the dome camera.

The present invention enables the setting of the tilt direction of the camera lens in a broader range, as well as realizes a camera image in high quality.

With reference to drawings, description will be provided on the dome camera according to the embodiments of the present invention, hereinafter. In the embodiments, an example of the dome camera used in a surveillance camera or other purposes will be described. The dome camera of the embodiments may be installed to a wall or a ceiling in a surveillance area, for example.

First Embodiment

Figure 2:
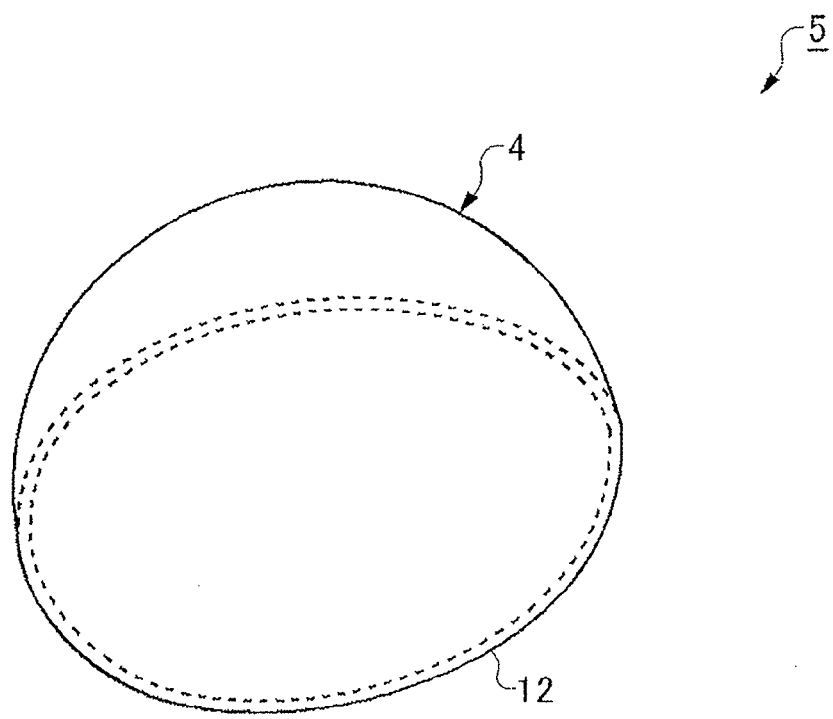
FIG. 2 is an exploded perspective view of a dome cover and an inner cover of the dome camera according to the first embodiment of the present invention.
Figure 2:
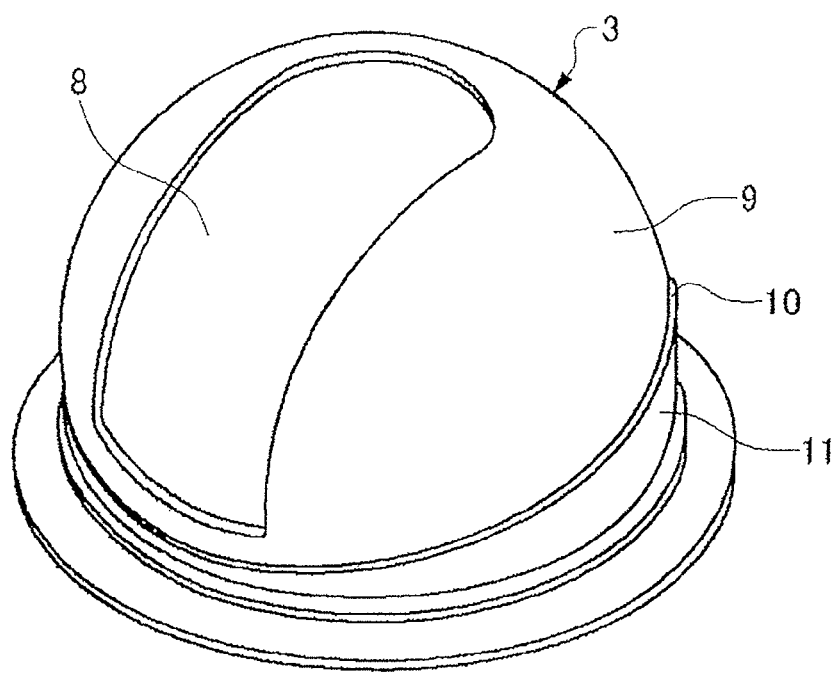
Figure 3:
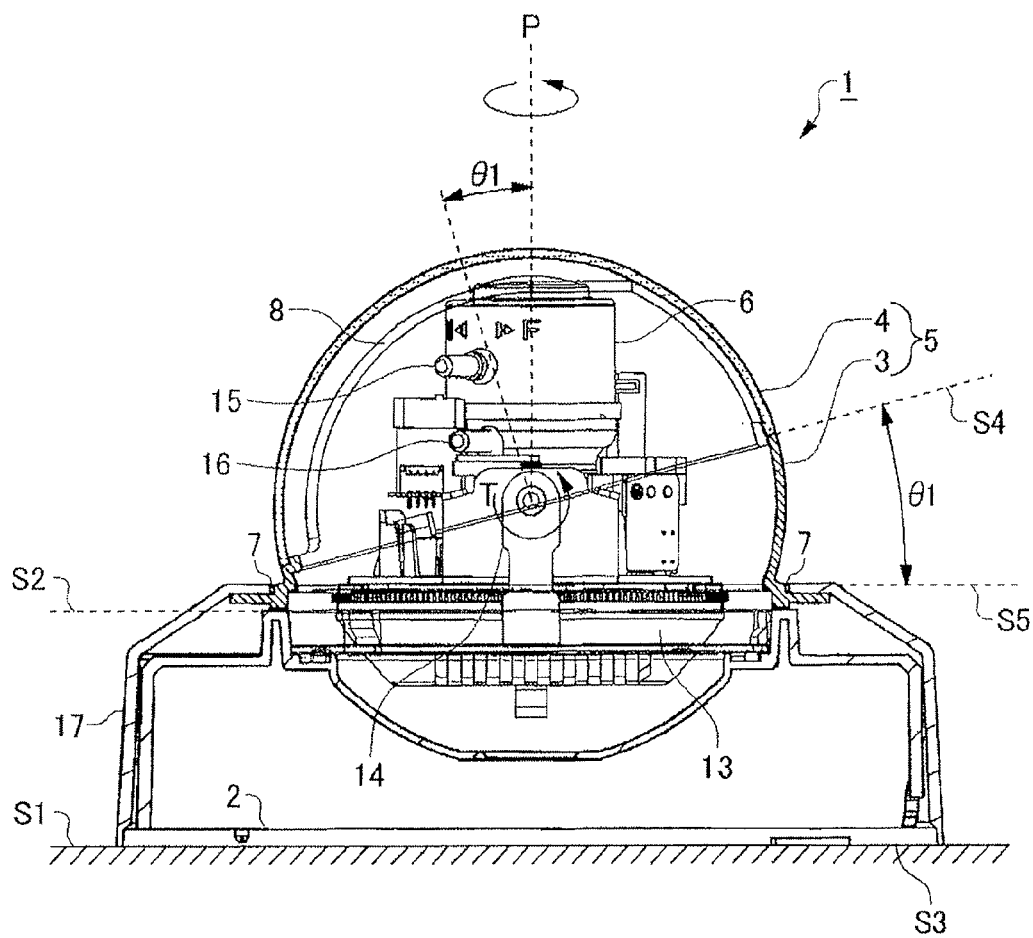
FIG. 3 is a side cross sectional view of the dome camera according to the first embodiment of the present invention.
Figure 4:
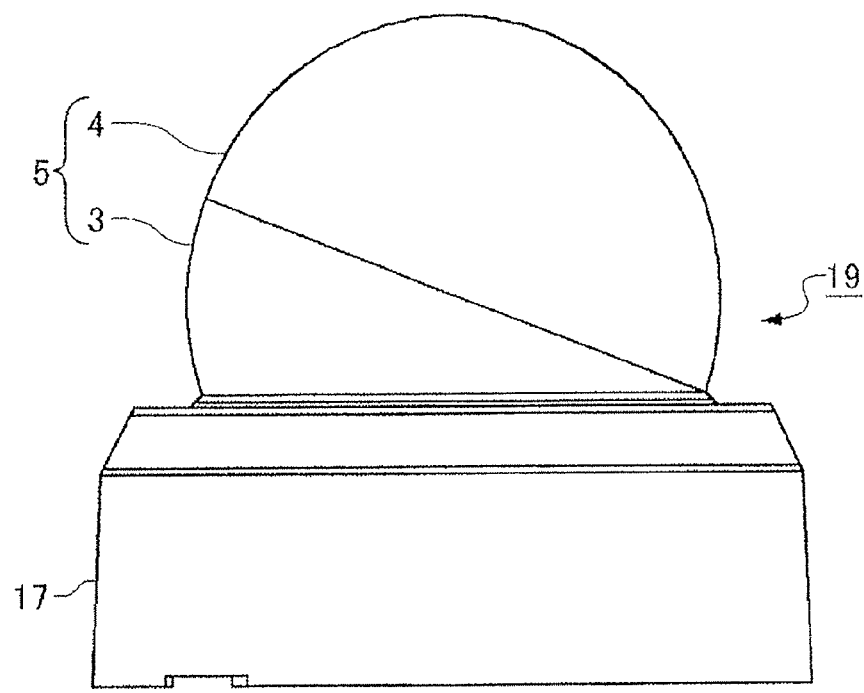
FIG. 4 is an exploded explanatory view of the dome camera according to the first embodiment of the present invention.
Figure 4:
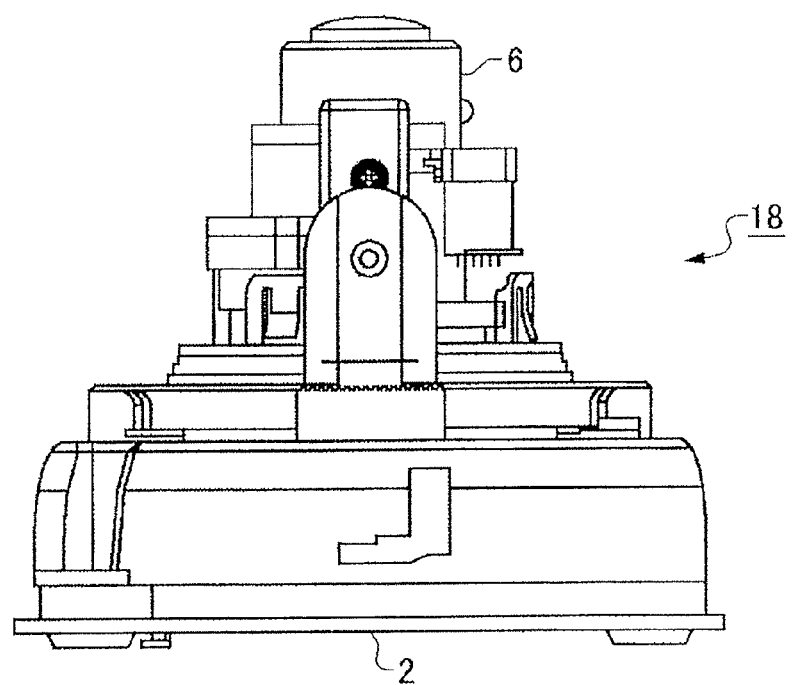

The configuration of the dome camera of the first embodiment of the present invention will be described with reference to the drawings. FIG. 1 is a perspective view of the dome camera of this embodiment. FIG. 2 is an exploded perspective view of the dome cover and the inner cover of the dome camera of this embodiment. FIG. 3 is a side sectional view of the dome camera of this embodiment. The FIG. 4 is an exploded explanation view of the dome camera of this embodiment of the present invention.

As illustrated in FIG. 1 to FIG. 4, the dome camera 1 of this embodiment includes a base 2, and a cover 5 constituted by an inner cover 3 and a dome cover (outer cover) 4. A camera lens 6 is provided on the base 2. The camera lens 6 is covered with the inner cover 3, and the inner cover 3 is covered with the semi-spherical dome cover 4. The base 2 is covered with a body cover 17. In this case, the base 2 and the camera lens 6 constitute a base assembly 18, and the cover 5 (the inner cover 3 and the dome cover 4) and the body cover 17 constitute a dome cover assembly 19. The body cover 17 is fixed to the base assembly 18 through a fitting structure not shown in the drawing. The cover 5 is rotatable relative to the body cover 17. The base 2, the cover 5, and the body cover 17 constitute a housing of the dome camera 1, and the camera lens 6 is housed in this housing of the dome camera 1. The dome cover 4 may be made of a transparent or semitransparent plastic material, and the inner cover 3 is made of an opaque (black, for example) plastic material.

The base 2 includes an attachment face S2 (lower face in FIG. 3) parallel to an installation face S1 for the dome camera 1, and a parallel support face S3 (upper face in FIG. 3) parallel to the attachment face S2. The parallel support face S3 is parallel to the installation face S1 for the dome camera 1. A parallel support portion 7 for supporting the inner cover 3 is disposed at the position of this parallel support face S3. The inner cover 3 is supported by this parallel support portion 7, and is rotatable around a pan axis P (rotatable in the pan direction). The pan axis P is an axis vertical to the parallel support face S3.

As illustrated in FIG. 1 and FIG. 2, the inner cover 3 includes a semi-spherical portion 9 having a window 8 in a long hole shape, and a partially spherical portion 11 having an annular inclined step portion 10. The semi-spherical portion 9 has a semi-spherical shape defined by cutting a sphere along an equatorial plane S4. The partially spherical portion 11 has a partially spherical shape defined by cutting the same sphere along the equatorial plane S4 and along a plane S5 inclined by an angle θ1 relative to the equatorial plane S4. Therefore, if the plane S5 is defined as a reference plane, the equatorial plane S4 is an inclined plane tilted by the angle θ1 from this reference plane. The spherical center of the semi-spherical portion 9 and the spherical center of the partially spherical portion 11 are concentric with each other. The shape of the semi-spherical portion 9 has a semi-spherical shape along the dome cover 4, and the spherical center of the semi-spherical portion 9 and the spherical center of the dome cover 4 are concentric with each other. The spherical centers of the semi-spherical portion 9 and the partially spherical portion 11 are thus so disposed as to be concentric with the spherical center of the dome cover 4.

In this case, the direction of the camera lens 6 (the tilt direction and the pan direction) has a fixed target direction to be set. The window 8 of the inner cover 3 is directed toward the target direction of the pan direction. In other words, the window 8 thus opens toward the target direction of the pan direction (the pan direction to be set). The window 8 of the inner cover 3 opens in a range from the vertical direction)(0° relative to the installation face S1 to the enlarged inclination limit angle (90° for example, as described later) in the tilt direction. The tilt direction of the camera lens 6 is defined in the acceptable tilt setting range (in the range from 0° to 90°). In other words, this window 8 is not only directed toward the target direction of the pan direction, but also opens toward the target direction of the tilt direction (the tilt direction to be set).

The inclined step portion 10 of the inner cover 3 is located at the position of an inclined plane S4. An end 12 (an annular portion corresponding to the equatorial portion) of the dome cover 4 is supported to the inclined step portion 10. While the end 12 of the dome cover 4 is supported to the inclined step portion 10 of the inner cover 3, the inner cover 3 is supported with the summit direction of the dome cover 4 inclined by the angle θ1 from the direction of the pan axis P (the vertical direction relative to the installation face S1) (see FIG. 3). The inclined plane S4 on which inclined step portion 10 is disposed is corresponding to the inclined support plane of the present invention. The outer face of the inner cover 3 and the outer face of the dome cover 4 are combined with each other with no step therebetween such that the end 12 of the dome cover 4 is supported to the inclined step portion 10 of the inner cover 3. Specifically, the outer faces of the inner cover 3 and the dome cover 4 are integrally and continuously combined to each other on the inclined support plane S4, so as to provide a substantially spherical appearance. In this embodiment, the end 12 of the dome cover 4 and the inclined step portion 10 are combined to each other with an adhesive, so as to fix the dome cover 4 to the inner cover 10. The end 12 of the dome cover 4 is coated in the same color (in black or gray, for example) as that of the inclined step portion 10 of the inner cover 3. A smoke treatment may be applied across the entire dome cover 4.

As illustrated in FIG. 3, the camera lens 6 is supported to a pan table 13 that is attached to the base 2 so as to be rotatable in the pan direction. A pair of supports 14 is extendingly provided on the pan table 13. The camera lens 6 is axially supported at the tip ends of the supports 14, so as to be rotatable around the tilt axis T (rotatable in the tilt direction). The tilt axis T is an axis extending vertically relative to the drawing paper of FIG. 3. The dome camera 1 of this embodiment is equipped with no motive power (such as a pan motor or a tilt motor) for rotating the camera lens 6 in the pan direction or in the tilt direction. The direction of the camera lens 6 is set by hand. Specifically, the dome camera 1 of this embodiment is the so-called fixed-type dome camera 1.

A variable focal lens may be used as the camera lens 6, for example. The variable focal lens includes a focus adjusting lever 15 used for a manual focus adjustment, and a zoom adjusting lever 16 used for a manual zoom adjustment. The focus adjusting lever 15 is a lever for rotating a focus ring used in the focus adjustment. The zoom adjusting lever 16 is a lever for rotating a zoom ring used in the zoom adjustment. The variable focus lens is a relatively inexpensive camera lens 6, and is often used in the fixed-type dome camera 1.

Figure 5:
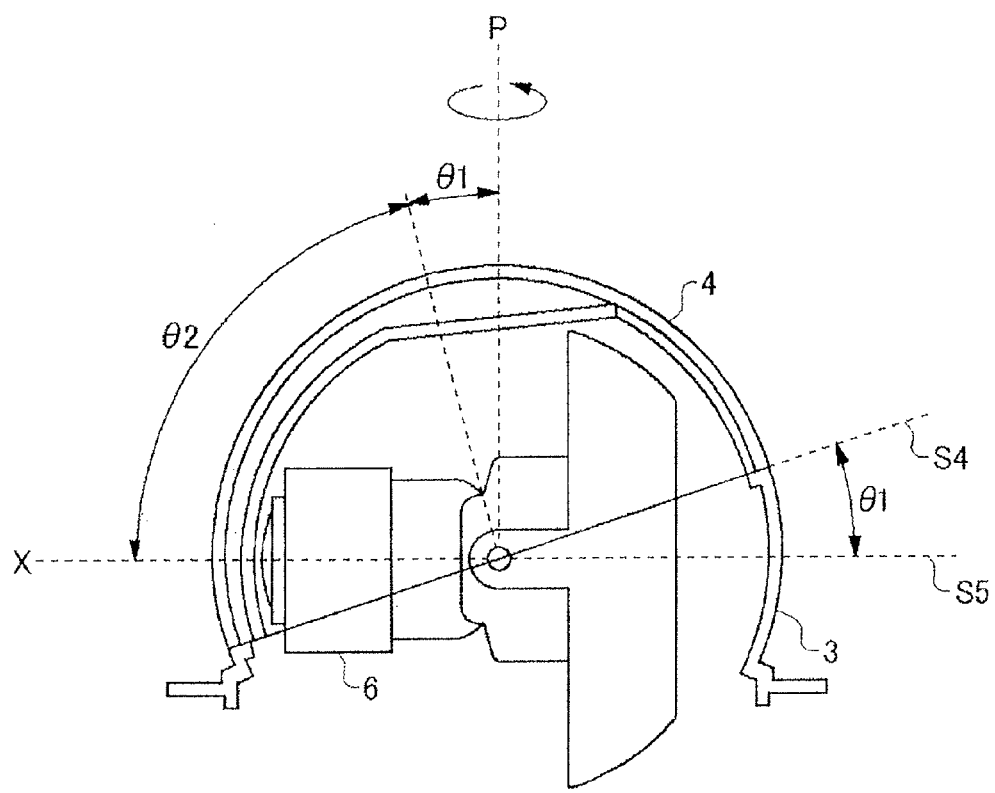
FIG. 5 is an explanatory view of an acceptable tilt setting range of the dome camera according to the first embodiment of the present invention.
Figure 6:
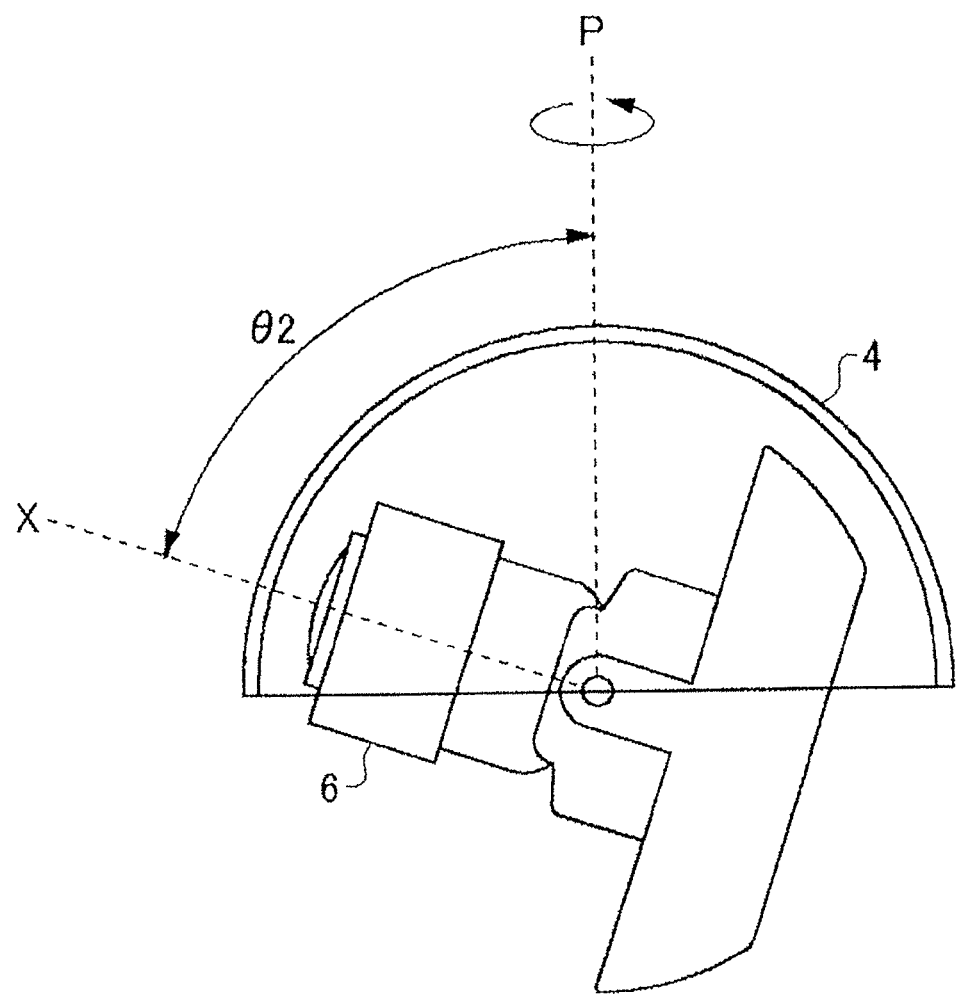
FIG. 6 is an explanatory view of an inclination limit angle of the dome cover according to the present invention.

With reference to FIG. 5 and FIG. 6, the description will now be provided on the acceptable setting range of the tilt direction (acceptable tilt setting range) of the dome camera 1 according to the present embodiment. FIG. 5 is an explanatory view of the acceptable tilt setting range of the dome camera 1 of this embodiment, and FIG. 6 is an explanatory view of the inclination limit angle of the dome cover 4.

As illustrated in FIG. 5, in the dome camera 1 of this embodiment, the dome cover 4 is supported to the inclined step portion 10 of the inner cover 3 such that the summit direction of the dome cover 4 is inclined by the angle θ1 from the direction of the pan axis P (the vertical direction relative to the installation face S1). In this case, the optical axis X of the camera lens 6 passes through the spherical center of the dome cover 4. In a general dome cover 4, as illustrated in FIG. 6, if the optical axis X of the camera lens 6 passes through the spherical center of the dome cover 4, the tilt direction of the camera lens 6 can be set only in the range from the summit direction of the dome cover 4 (the general direction of the pan axis P, the upward direction of FIG. 6) to the predetermined inclination limit angle θ2. If the tilt direction of the camera lens 6 exceeds this inclination limit angle θ2, vignetting is caused.

Contrary to this, in the dome camera 1 of this embodiment, since the dome cover 4 is inclined by the angle θ1, the tilt direction of the camera lens 6 can be set within an angular range from the direction of the pan axis P (the vertical direction relative to the installation face S1, the upward direction of FIG. 5) to the enlarged inclination limit angle (the inclination angle θ1 of the dome cover 4+the inclination limit angle θ2 of the dome cover 4). In other words, the acceptable tilt setting range is enlarged by the inclination of the dome cover 4.

Description will now be provided on the installation procedure of the dome camera 1 of this embodiment having the aforementioned configuration.

The dome camera 1 of this embodiment is installed to the installation face S1 in such a manner that the base assembly 18 of the dome camera 1 is fixed to the installation face S1 (such as a wall face or a ceiling face) with fixing bolts (not shown), and the direction of the camera lens 6 is adjusted. At this time, the pan direction of the camera lens 6 is manually rotated, so as to direct the pan direction of the camera lens 6 toward its target direction. The camera lens 6 is then turned in the tilt direction manually, so as to direct the tilt direction of the camera lens 6 toward its target direction. After the setting of the direction of the camera lens 6 is completed, the dome cover assembly 19 is attached to the base assembly 18. The cover 5 is rotatable relative to the base assembly 18, and the rotation of the cover 5 brings the direction of the window 8 into accordance with the direction of the camera lens 6. The focus or zoom adjustment of the camera lens 6 is appropriately conducted.

The dome camera 1 of the first embodiment of the present invention allows the setting of the tilt direction of the camera lens 6 in a broader angular range, thereby realizing a camera image in high quality.

Specifically, this embodiment allows the setting of the tilt direction of the camera lens 6 in the broader angular range from the vertical direction relative to the installation face S1 to the enlarged inclination limit angle (angle defined by adding the inclination angle θ1 to the inclination limit angle θ2 of the dome cover 4). For example, if the semi-spherical dome cover 4 has the inclination limit angle of 75° (assuming that the summit direction is 0°), a common dome camera allows the setting of the tilt direction of the camera lens 6 only in an angular range from the summit direction)(0° to the inclination limit angle (75°, for example) of the dome cover 4. In the conventional dome camera (the dome camera of Patent Literature 1), the tilt direction of the camera lens 6 can be set in a broader angular range (range from 0° to 90°, for example), but the position of the optical axis X of the camera lens 6 is deviated from the spherical center of the dome cover 4, so that quality of a camera image is deteriorated due to the lens effect of the dome cover 4.

To the contrary, in this embodiment, the target direction of the pan direction (the pan direction to be set) of the camera lens 6 is predefined, and the inner cover 3 is turned in the target direction so as to incline the dome cover 4 toward this target direction, thereby enlarging the inclination limit angle θ2 by the inclination angle θ1. For example, assuming that the angle θ1 at which the dome cover 4 is inclined (the inclination angle of the inclination support plane S4) is 15°, the tilt angle direction of the camera lens 6 can be set in the broader angular range (acceptable tilt setting range) from the vertical direction relative to the installation face S1)(0° to the enlarged inclination limit angle (90°=75° (θ2)+15° (θ1)). In this embodiment, the optical axis X of the camera lens 6 passes through the spherical center of the dome cover 4, so that it is possible to realize a camera image in high quality.

In this embodiment, the inner cover 3 and the dome cover 4 are combined on the inclination support plane S4, so as to have a substantially spherical appearance, thereby preventing inference of the direction of the camera lens 6 through the appearance of the dome camera 1.

This embodiment enables the inner cover 3 to have a function for securing a visual field of the camera lens 6 (function as the window 8), and a function for supporting the dome cover 4 (function as the inclined step portion 10). In this case, one component (inner cover 3) has the both functions, which reduces the number of components of the dome camera.

In this embodiment, when the inner cover 3 and the dome cover 4 are combined to each other, the combined portions (of the end 12 of the dome cover 4 and the inclined step portion 10 of the inner cover 3) have the same color tone, which prevents the difference in color tone at the combined portions. The dome camera 1 thus have a substantially spherical appearance, which prevents inference of the direction of the camera lens 6 through the appearance of the dome camera 1.

In this embodiment, when the inner cover 3 and the dome cover 4 are combined to each other, the end 12 in a dark color (such as black or gray, for example) of the dome cover 4 prevents the difference in color tone at the combined portions (the end 12 of the dome cover 4). The dome camera 1 thus have a substantially spherical appearance. Since the dome camera 1 has a substantially spherical appearance, it is possible to prevent inference of the direction of the camera lens 6 through the appearance of the dome camera 1.

In this embodiment, when the inner cover 3 and the dome cover 4 are combined to each other, the dome cover 4 to which the smoke treatment is applied prevents the internal structure from being visible through the dome cover 4, which hinders inference of the direction of the camera lens 6 through the appearance of the dome camera 1.

Second Embodiment

Description will now be provided on the dome camera according to the second embodiment of the present invention. Description will be provided mostly on the features of the dome camera of the second embodiment, which are different from those of the dome camera of the first embodiment. The configurations and the operations of this embodiment are the same as those of the first embodiment unless specifically mentioned.

Figure 7:
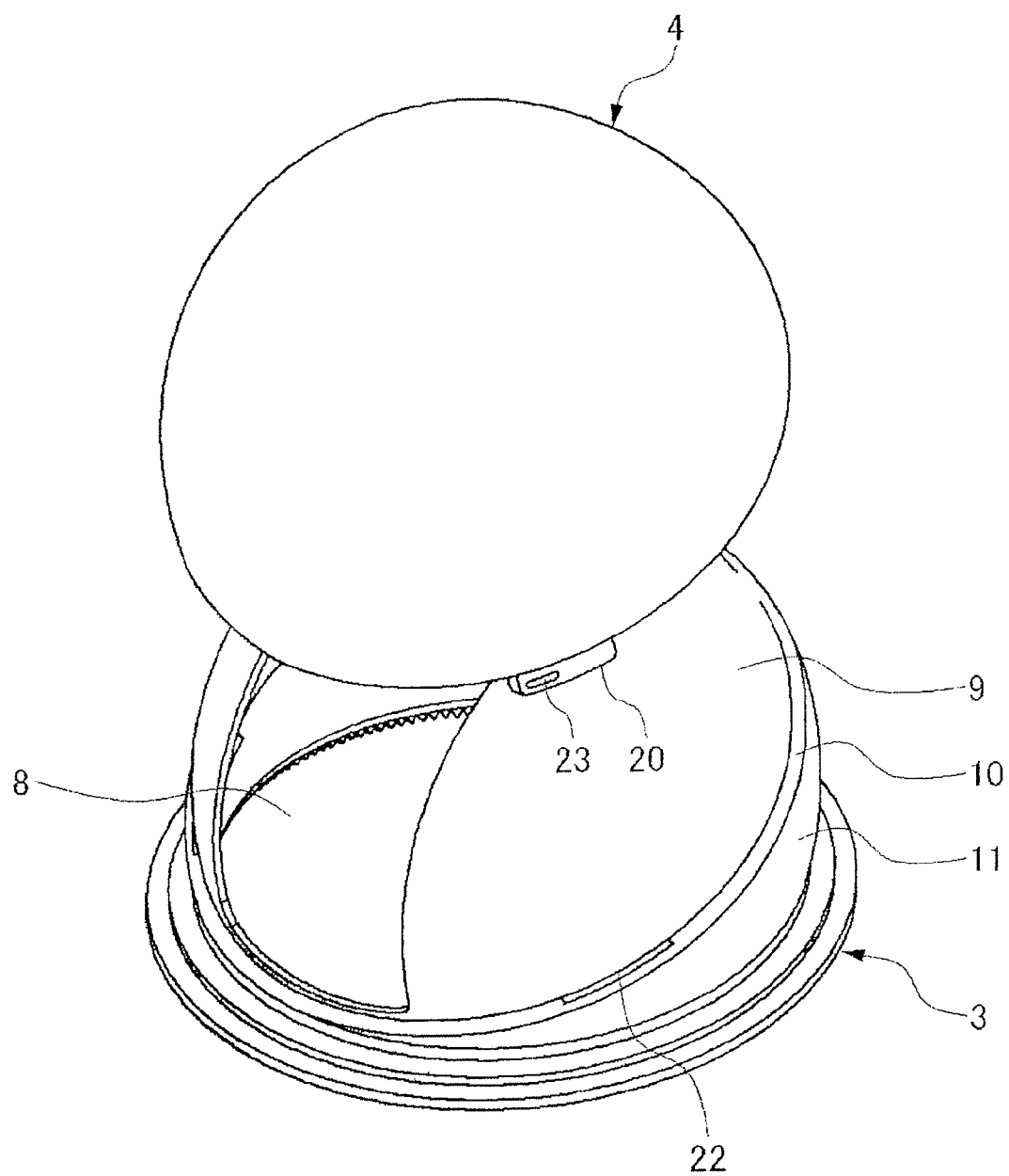
FIG. 7 is an exploded perspective view of a dome cover and an inner cover of the dome camera according to a second embodiment of the present invention.
Figure 8:
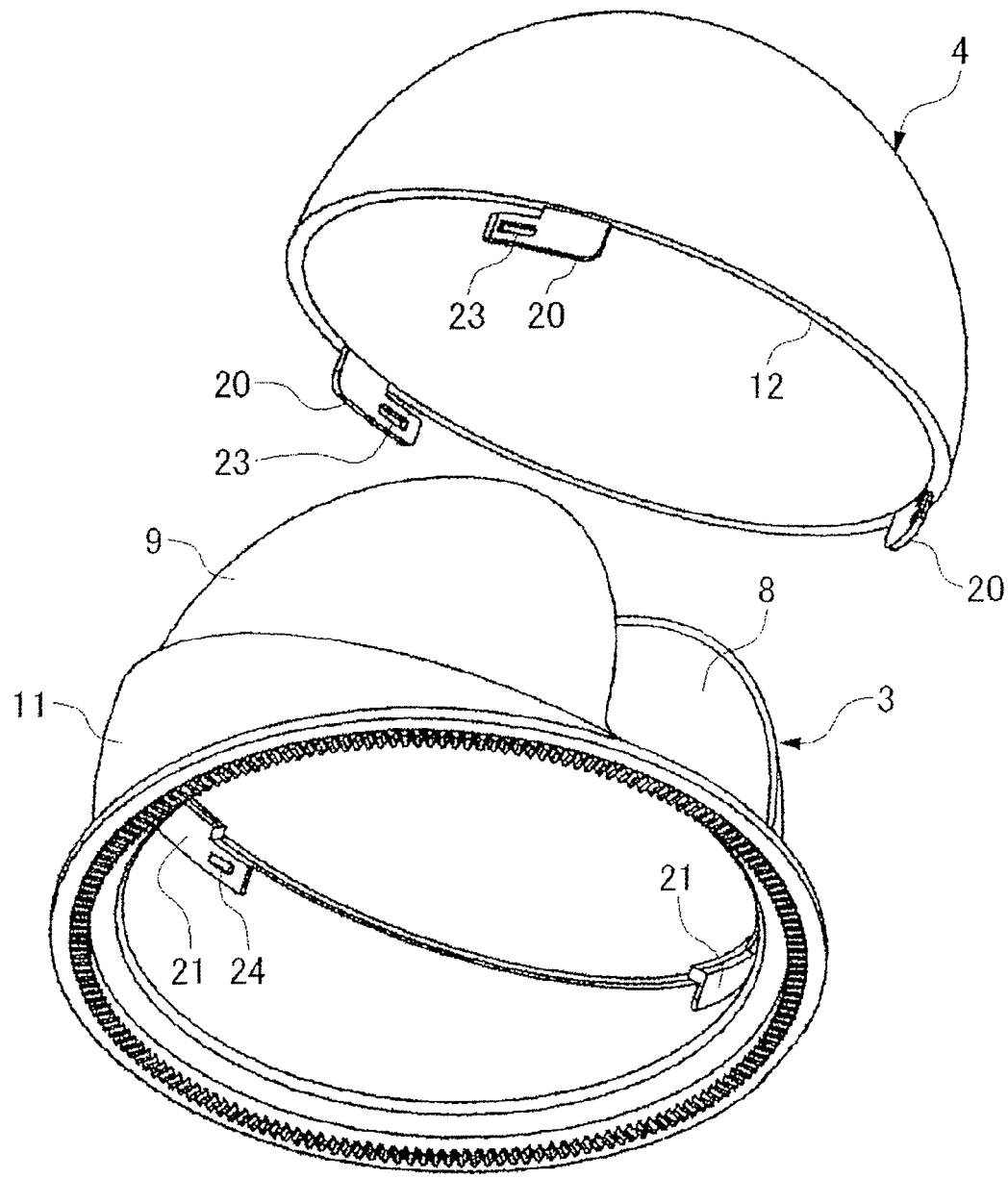
FIG. 8 is an exploded perspective view of the dome cover and the inner cover of the dome camera according to the second embodiment of the present invention.
Figure 9:
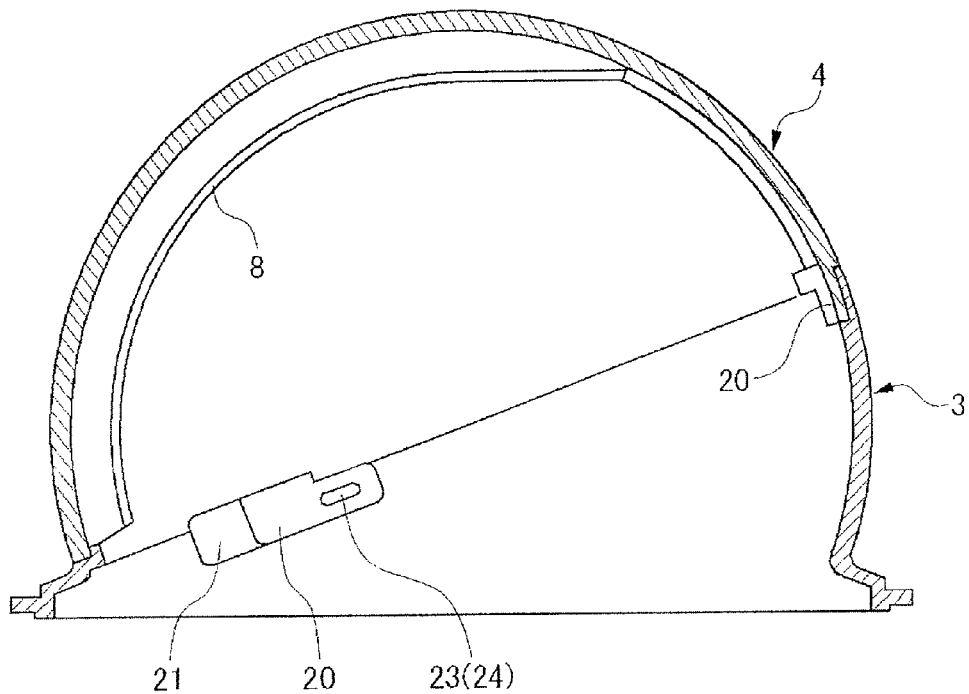
FIG. 9 is a side cross sectional view of a cover (the dome cover and the inner cover) according to the second embodiment of the present invention.

FIG. 7 and FIG. 8 are exploded perspective views of the dome cover and the inner cover of the dome camera of this embodiment. FIG. 9 is a side sectional view of the cover (the dome cover and the inner cover) of this embodiment.

As illustrated in FIG. 7 to FIG. 9, in this embodiment, three locking projections 20, each in an L shape, are extendingly disposed at the end 12 of the dome cover 4, and three locked recesses 21 are provided on an inner face of the inner cover 3. Insertion holes 22 are formed in the inclined step portion 10 of the inner cover 3, and the three locking projections 20 are inserted through the insertion holes 22. With the locking projections 20 of the dome cover 4 inserted through the insertion holes 22 in the inclined step portion 10, the dome cover 4 is rotated, so that the locking projections 20 come into engagement with the locked recesses 21, thereby fixing the dome cover 4 to the inner cover 3. The locking projections 20 are corresponding to the locking portions of the present invention, and the locked recesses 21 are corresponding to the locked portions of the present invention. Herein, an example of providing three locking projections 20 and three locked recesses 21 will be described; but not to mention that the number of the locking projections 20 and the locked recesses 21 is not limited to this.

As shown in FIG. 7 to FIG. 9, each locking projection 20 of the dome cover 4 is provided with a locking hole 23, and each locked recess 21 of the inner cover 3 is provided with a locked protrusion 24. FIG. 10(a) is an explanatory view illustrating an example of the locking hole 23 and the locked protrusion 24, and FIG. 10(b) is an explanatory view illustrating another example of the locking hole 23 and the locked protrusion 24.

Figure 10:
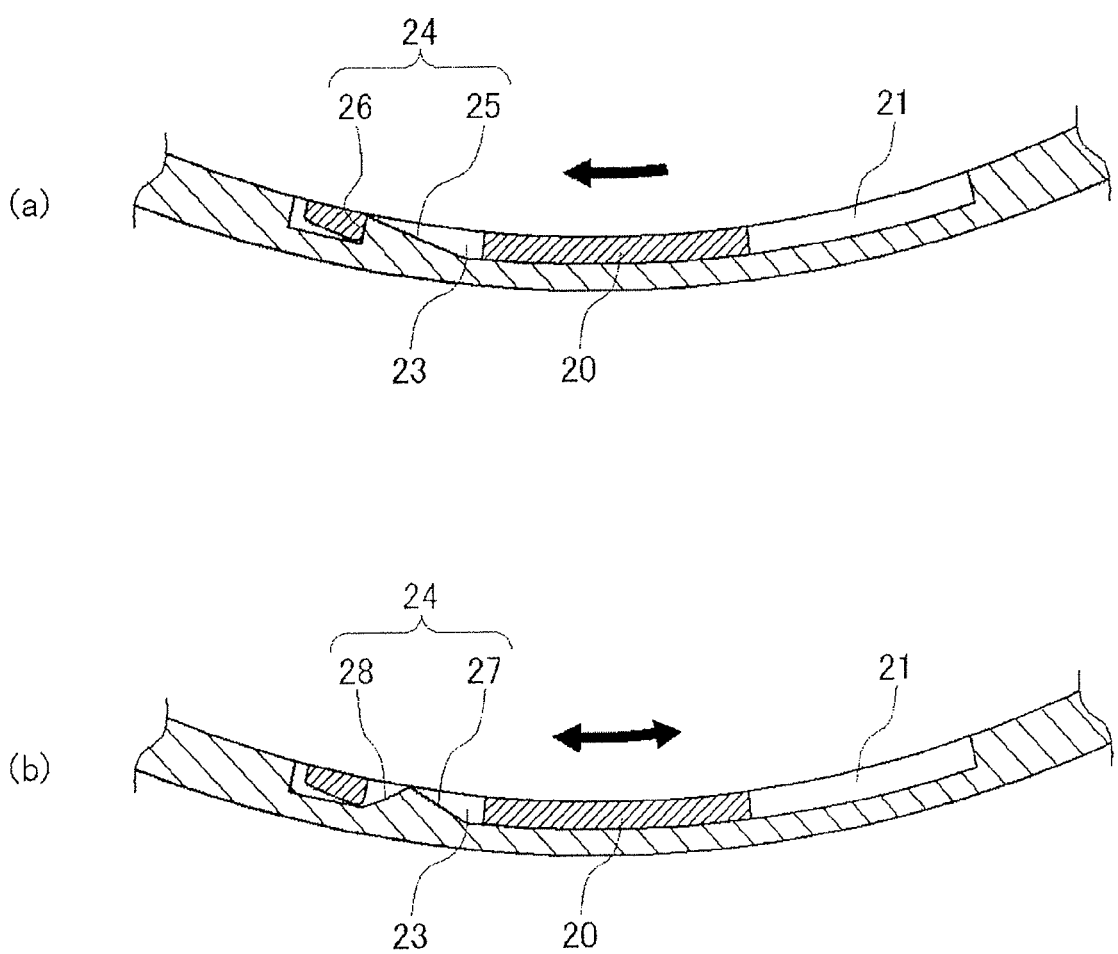
FIG. 10 are explanatory views of a locking hole and a locked protrusion according to the second embodiment of the present invention.

In the example of FIG. 10(a), the locked protrusion 24 includes an inclined face 25 and a lock wall 26. As described above, the dome cover 4 is fixed to the inner cover 3 by turning the dome cover 4 so that the locking projections 20 comes into engagement with the locked recesses 21. In the example of FIG. 10 (a), if the dome cover 4 is rotated, each locking projection 20 moves from the right to the left as indicated by the arrow in the drawing, so as to be engaged with each locked recess 21. At this time, the periphery at the end (periphery on the left) of the locking hole 23 moves beyond the inclined face 25, so that the locking hole 23 is engaged with the locked protrusion 24. This engagement allows the fixation of the dome cover 4 to the inner cover 3. In this state, even if the dome cover 4 is attempted to be reversely rotated, the periphery of each locking hole 23 is locked by each lock wall 26, so as not to move beyond the lock wall 26. In this manner, the unlocking of the engagement between each locking hole 23 and each locked protrusion 24 can be prevented, which prevents the unlocking of the engagement between the locking projections 20 and the locked recesses 21.

In the example of FIG. 10(b), each locked protrusion 24 includes a first inclined face 27 and a second inclined face 28. In the example of FIG. 10(b), if the dome cover 4 is rotated, each locking projection 20 also moves from the right to the left in the drawing, so as to be engaged with each locked recess 21. At this time, the periphery at the end (periphery on the left) of each locking hole 23 moves beyond the first inclined face 27 (inclined face on the right), so that each locking hole 23 is engaged with each locked protrusion 24. This engagement allows the fixation of the dome cover 4 to the inner cover 3. In this state, if the dome cover 4 is reversely rotated, each locking projection 20 moves from the left to the right, and then comes out of engagement with each locked recess 21. At this time, the periphery at the end (periphery on the left) of the locking hole 23 moves beyond the second inclined face 28 (inclined face on the left), so as to unlock the engagement between each locking hole 23 and each locked protrusion 24. This unlock allows the uninstallation of the dome cover 4 from the inner cover 3.

In this embodiment, as illustrated in FIG. 9 and FIG. 10, in the engagement state between each locking projection 20 and each locked recess 21, the inner faces of the dome cover 4 and of the inner cover 3 may be substantially aligned in height. In other words, the joint portions between the dome cover 4 and the inner cover 3 have no step and have the substantially same height.

Figure 11:
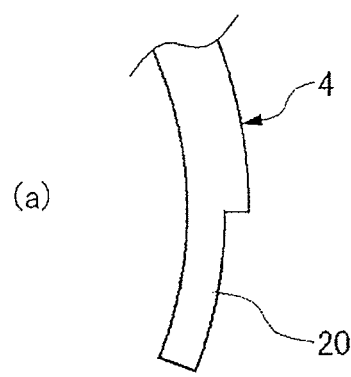
FIG. 11 are explanatory views of locking projections according to the second embodiment of the present invention.
Figure 11:
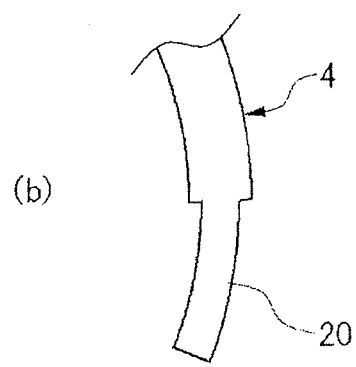
Figure 11:
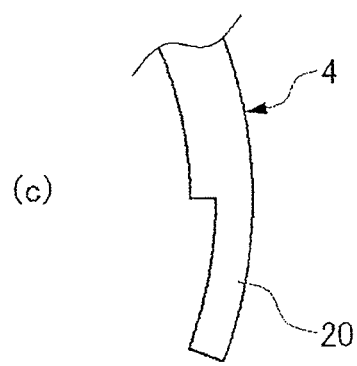

Each locking projection 20 has a smaller thickness than that of the dome cover 4. FIG. 11(a) to FIG. 11(c) illustrate three examples of the locking projection 20. As illustrated in FIG. 11(a) to FIG. 11(c), the thickness of the locking projection 20 constitutes a part of the thickness of the dome cover 4. In other words, the thickness of the locking projection 20 does not constitute the whole thickness of the dome cover 4.

The dome camera 1 according to the second embodiment of the present invention can also attain the same effect as that of the first embodiment.

In addition, in this embodiment, each locking projection 20 at the end 12 of the dome cover 4 is inserted through each insertion hole of the inclined step portion 10 of the inner cover 3, and is engaged with each locked recess 21 of the inner cover 3, thereby readily fixing the dome cover 4 to the inner cover 3.

In this embodiment, as illustrated in FIG. 10(a) and Figure (b), each locking projection 20 is provided with the locking hole 23, and each locked recess 21 is provided with the locked protrusion 24.

In the example of FIG. 10 (a), in the installation of the dome cover 4 to the inner cover 3, the engagement of each locking projection 20 with each locked recess 21 is attained such that the periphery of the locking hole 23 of each locking projection 20 moves beyond the inclined face 25, and each locking hole 23 is engaged with each locked protrusion 24. The dome cover 4 is thus readily fixed to the inner cover 3. On the other hand, if an attempt to unlock the engagement between each locking projection 20 and each locked recess 21 is made so as to uninstall the dome cover 4 from the inner cover 3, the periphery of the locking hole 23 of each locking projection 20 is locked by each lock wall 26, thereby preventing the disengagement between each locking portion and each locked portion. This configuration prevents the dome cover 4 from being readily uninstalled from the inner cover 3.

In the example of FIG. 10(b), in the installation of the dome cover 4 to the inner cover 3, the engagement of each locking projection 20 with each locked recess 21 is attained such that the periphery of the locking hole 23 of each locking projection 20 may move beyond each first inclined face 27, and each projecting hole 23 comes into engagement with each locked protrusion 24. The dome cover 4 is thus readily fixed to the inner cover 3. In the uninstallation of the dome cover 4 from the inner cover 3, the unlocking of each locking projection 20 from each locked recess 21 is attained such that the periphery of the locking hole 23 of each locking projection 20 moves beyond each second inclined face 28, thereby unlocking the engagement between each locking portion and each locked portion. The dome cover 4 is thus readily uninstalled from the inner cover 3. In this manner, the dome cover 4 can be detachably installed to the inner cover 3.

In this embodiment, each locking projection 20 at the end 12 of the dome cover 4 has a smaller (thinner) thickness than that of the dome cover 4, so that each locking projection 20 can have an appropriate flexibility. (The periphery of the locking hole 23 of) each locking projection 20 with an appropriate flexibility can easily moves beyond the respective inclined faces 25, 27, 28 of each locked protrusion 24 when the dome cover 4 is installed to the inner cover 3, and thus the dome cover 4 can readily be fixed to the inner cover 3.

In this embodiment, the alignment in height of the inner faces of the dome cover 4 and the inner cover 3 can prevent the camera lens 6 or the like from being caught by the inner face of the cover 5 (the inner cover 3 and the dome cover 4) even if the inner cover 3 is rotated with the dome cover 4 installed to the inner cover 3.

The embodiments of the present invention have been described using the aforementioned examples, but the scope of the present invention is not limited to them, and various modifications and alternations may be made within the scope set forth in the claims.

The preferred embodiments of the present invention that can be considered at the present time have been explained, but it should be appreciated that various modifications can be made on the embodiments of the present invention, and it is intended by the appended claims to cover all such modifications which fall within the true spirit and scope of the invention.

INDUSTRIAL APPLICABILITY

As described above, the dome camera according to the present invention attains effects to enable the setting of the tilt direction of the camera lens in a broader range, as well as realize a camera image in high quality, and is useful as a surveillance camera and the like.

REFERENCE SIGNS LIST

1 Dome camera
2 Base
3 Inner cover
4 Dome cover
5 Cover
6 Camera lens
7 Parallel support portion
8 Window
9 Semi-spherical portion
10 Inclined step portion
11 Partially spherical portion
12 End
13 Pan table
14 Support
15 Focus adjusting lever
16 Zoom adjusting lever
17 Body cover
18 Base assembly
19 Dome cover assembly
20 Locking projection (locking portion)
21 Locked recess (locked portion)
22 Insertion hole
23 Locking hole (locking portion)
24 Locked protrusion (locked portion)
25 Inclined face
26 Lock wall
27 First inclined face
28 Second inclined face
S1 Installation face
S2 Attachment face
S3 Parallel support face
S4 equatorial plane, inclined plane (inclined support plane)
S5 Plane
P Pan axis
T Tilt axis
X Optical axis

What is claimed is:

1. A dome camera installable to an installation face and having a camera lens, an orientation of the camera lens being adjustable, the dome camera comprising:

an inner cover covering the camera lens; and
a semi-spherical outer cover covering the inner cover,
the camera lens being rotatable in a tilt direction and in a pan direction;
the inner cover including:
a partially spherical portion having a reference plane defining a lowermost surface of the partially spherical portion and substantially parallel to the installation face and having an inclined support plane on which the outer cover is supported such that a radial line perpendicular to the inclined support plane is inclined at a predetermined inclination angle with respect to a line passing through a center of the partially spherical portion and extends perpendicular to the installation face, and
a semi-spherical portion having a semi-spherical shape, a window provided in the semi-spherical portion, the semi-spherical portion covered by the outer cover supported on the inclined support plane, and
a cover comprising at least the inner cover and the outer cover, the cover being rotatable in the pan direction, so as to orient the window in accordance with the orientation of the camera lens.

2. The dome camera according to claim 1, wherein the inclined support plane is disposed between the partially spherical portion and the semi-spherical portion.

3. The dome camera according to claim 1, wherein an optical axis of the camera lens passes through a spherical center of the outer cover.

4. The dome camera according to claim 1, wherein the inner cover and the outer cover are integrally and continuously combined on the inclined support plane, so as to have a substantially spherical appearance.

5. The dome camera according to claim 1, wherein the partially spherical portion includes an inclined step portion that supports an end of the outer cover.

6. The dome camera according to claim 1, wherein spherical centers of the semi-spherical portion and the partially spherical portion are concentric with a spherical center of the outer cover.

7. The dome camera according to claim 1, wherein the outer cover has plural locking portions, and the inner cover has plural lock portions engagable with the plural locking portions, and the locking portions are engaged with the lock portions so as to fix the outer cover to the inner cover.

8. The dome camera according to claim 7, wherein each of the locking portions includes an L shaped locking projection extending from an end of the outer cover, each of the lock portions includes a locking recess provided on an inner face of the inner cover, insertion holes for inserting the locking projections are provided in an inclined step portion of the inner cover, and the locking projections are configured to be inserted through the insertion holes and to engage with the locking recesses.

9. The dome camera according to claim 8, wherein each of the locking portions includes a locking hole provided in each locking projection, each of the lock portions includes a locking protrusion provided on each locking recess, each of the locking protrusions includes an inclined face and a lock wall, wherein, upon engagement of the locking projections with the locking recesses, a periphery of each locking hole moves beyond the inclined face, and each locking hole comes into engagement with a locking protrusion, and upon an attempt to unlock the engagement between the locking projections and the locking recesses, the periphery of each locking hole is locked by the lock wall, so as to prevent unlocking of the engagement between each locking hole and the locking protrusion.

10. The dome camera according to claim 8, wherein
each of the locking portions includes a locking hole provided in each locking projection,
each of the lock portions includes a locking protrusion provided on each locking recess,
each of the locking protrusions includes a first inclined face and a second inclined face,
wherein, upon engagement of the locking projections with the locking recesses, a periphery of each locking hole moves beyond the first inclined face, and each projecting hole comes into engagement with each locked protrusion, and
in unlocking the engagement between the locking projections and the locking recesses, the periphery of each locking hole moves beyond the second inclined face, so as to unlock the engagement between each locking hole and the locking protrusion.

11. The dome camera according to claim 9, wherein
each of the locking projections has a smaller thickness than a thickness of the outer cover.

12. The dome camera according to claim 7, wherein
in an engaged state between the locking portions and the lock portions, inner faces of the outer cover and the inner cover are aligned in height.

13. The dome camera according to claim 5, wherein
the end of the outer cover is of a same color as a color of the inclined step portion of the inner cover.

14. The dome camera according to claim 5, wherein
the end of the outer cover is of a dark color.

15. The dome camera according to claim 1, wherein
a smoke treatment is provided to the outer cover.

16. The dome camera according to claim 1, wherein the window is provided in a portion of the inner cover over which the outer cover extends.

17. The dome camera according to claim 1, wherein the inner and outer covers are connected to prevent relative movement between the inner and outer covers.

18. The dome camera according to claim 1, the outer cover being superimposed on the semi spherical portion of the inner cover and is not superimposed on the partially spherical portion of the inner cover.

19. A dome camera installable to an installation surface and having a camera lens, an orientation of the camera lens being settable, the dome camera comprising:
the camera lens being rotatable in a tilt direction and in a pan direction; and
a camera lens cover, the camera lens being received within the camera lens cover, the camera lens cover comprising an inner cover and an outer cover, the inner cover including a support portion extending in a plane substantially parallel to the installation surface, the inner cover and the outer cover being movable in the pan direction without relative movement therebetween;
the inner cover having a generally partially spherical shape and having an outer portion extending from the support portion to an inclined support plane that is inclined with respect to the support portion, and an inner portion extending from the inclined support plane, a window provided in the inner cover, a ledge transitioning between the inner and outer portions, the outer portion of the inner cover being supported by the ledge; and
the outer cover having a generally semi-spherical shape, and overlying the inner portion of the inner cover, an outer surface of the outer cover and an outer surface of the outer portion of the inner cover providing a substantially smooth surface, a shape of an outer surface of the inner portion of the inner cover substantially conforming to a shape of an inner surface of the outer cover.

* * * * *